(12) United States Patent
Lee

(10) Patent No.: US 7,839,914 B2
(45) Date of Patent: Nov. 23, 2010

(54) METHOD AND APPARATUS FOR CHANNEL ESTIMATION TO ELECTRO-MAGNETIC WAVE MULTI PATH BETWEEN SENDER AND RECEIVER BY USING CHIRP SIGNAL

(75) Inventor: Kyung-Kuk Lee, Dongjak-gu (KR)

(73) Assignee: Orthotron Co., Ltd., Seongnam-si, Gyeonggi-do (KR)

( * ) Notice: Subject to any disclaimer, the term of this patent is extended or adjusted under 35 U.S.C. 154(b) by 723 days.

(21) Appl. No.: 11/884,649

(22) PCT Filed: Feb. 8, 2006

(86) PCT No.: PCT/KR2006/000453

§ 371 (c)(1),
(2), (4) Date: Aug. 17, 2007

(87) PCT Pub. No.: WO2006/090986

PCT Pub. Date: Aug. 31, 2006

(65) Prior Publication Data

US 2008/0165833 A1 Jul. 10, 2008

(30) Foreign Application Priority Data

Feb. 23, 2005 (KR) .................. 10-2005-0015100
Jul. 21, 2005 (KR) .................. 10-2005-0066484

(51) Int. Cl.
*H04B 1/69* (2006.01)
(52) U.S. Cl. .................... 375/139; 375/150
(58) Field of Classification Search .......... 375/139, 375/130, 295, 316, 146, 147, 149, 329, 334, 375/339, 150; 342/103, 132, 134; 370/210, 370/480

See application file for complete search history.

(56) References Cited

U.S. PATENT DOCUMENTS 5,748,670 A 5/1998 Zastrow (Continued)

OTHER PUBLICATIONS

International Search Report for Application No. PCT/KR2006/000453, dated May 18, 2006.

*Primary Examiner*—Khai Tran
(74) *Attorney, Agent, or Firm*—Lahive & Cockfield, LLP; EuiHoon Lee, Esq.

(57) ABSTRACT

Disclosed is a method and an apparatus for channel estimation regarding electromagnetic wave multi-path characteristics between a sender and a receiver by using a chirp signal. The method includes the steps of (a) multiplying a received composite signal by a narrowband chirp-shift-keying signal or narrowband multiple center-frequency-chirp signal generated by the receiver itself and outputting a sum of individual frequency components resulting from difference in distance of multiple paths for up-chirp and down-chirp signal portions of a chirp-shift-keying signal, respectively, the received composite signal being formed by generating narrowband chirp-shift-keying signals or narrowband multiple center-frequency-chirp signals by the sender, sending the signals by a transmission antenna, receiving the signals by a reception antenna of the receiver via a multi-path channel, superimposing the signals, and adding the signals; (b) multiplying outputs of the up-chirp and down-chirp signal portions of the sum of individual frequency components and calculating a tolerance frequency output; (c) compensating for a frequency tolerance of the sum of individual frequency components by using the tolerance frequency output and generating a frequency compensation output; (d) compensating for discontinuity of chirp-shift-keying signals resulting from use of the narrowband chirp-shift-keying signals or the narrowband multiple center-frequency-chirp signals regarding the frequency compensation output and generating a discontinuity compensation output having no discontinuity; (e) decomposing the discontinuity compensation output into individual multi-path signals by using a frequency analysis method; and (f) extracting an attenuation component and a time delay component caused by the multi-path channel from the individual multi-path signals by using a size of frequency components of each frequency.

13 Claims, 11 Drawing Sheets

U.S. PATENT DOCUMENTS 6,252,882 B1 6/2001 Matsui et al.
6,498,822 B1 12/2002 Tanaka et al.
6,683,904 B2 1/2004 Linder et al.
7,110,432 B2 * 9/2006 Hooton ....................... 375/139
7,130,361 B1 * 10/2006 Enderlein et al. ........... 375/324

* cited by examiner (a)

(b)

(a)

(b)

METHOD AND APPARATUS FOR CHANNEL ESTIMATION TO ELECTRO-MAGNETIC WAVE MULTI PATH BETWEEN SENDER AND RECEIVER BY USING CHIRP SIGNAL

RELATED APPLICATIONS

This application is a 35 U.S.C. 371 national stage filing of International Application No. PCT/KR2006/000453, filed Feb. 8, 2006, which claims priority to Korean Patent Application No. 2005-66484 filed on Jul. 21, 2005 and Korean Patent Application No. 2005-15100 filed on Feb. 23, 2005. The contents of the aforementioned applications are hereby incorporated by reference.

TECHNICAL FIELD

The present invention relates to a method and an apparatus for channel estimation regarding electromagnetic wave multi-path characteristics between a sender and a receiver by using a chirp signal. More particularly, the present invention relates to a method and an apparatus for channel estimation regarding electromagnetic wave multi-path characteristics between a sender and a receiver wherein, when a reception antenna receives a chirp signal, a narrowband chirp-shift-keying signal which includes narrowband chirp signals repeated along a time axis, or a narrowband multiple center-frequency-chirp signal which is the sum of chirp signals having various center frequencies, from the sender via a wave multi-path, the receiver multiplies the received signal by the chirp signal, the chirp-shift-keying signal, or the multiple center-frequency-chirp signal, which are used by the sender and the receiver, for conversion into individual frequencies which are proportional to time difference between the chirp signals, and uses it for electromagnetic wave multi-path channel estimation.

BACKGROUND ART

One of the frequently used conventional channel estimation methods is a direct sequence spread spectrum method. In order to improve the accuracy of channel estimation in this method, the width of chips used for spreading should be reduced (i.e. wide bandwidth), while the amount of spreading should be increased. In addition, the frequency reference used in this method should have a very small error so that the precision of channel estimation, particularly estimation of time delay values can be increased. An example of this method can be found in the case of a GPS (global positioning system).

In order to improve the accuracy of time delay measurement among multi-path channel parameters, the frequency bandwidth of used signals should be increased. This is because an error in time delay measurement is inversely proportional to a used frequency bandwidth. Particularly, in order to reduce the measurement error to lower than a threshold value in a method for increasing the frequency bandwidth of signals, the frequency bandwidth should be increased up to a predetermined value. However, there is a difficulty in meeting this requirement due to various frequency regulations.

In addition, a high degree of precision is required for the frequency reference used in the sender and receiver, in order to improve the accuracy of time delay measurement among multi-path channel parameters. To this end, a high-precision oscillator should be used. However, this increases the overall cost of the system.

In summary, various frequency regulations deters the increase of the frequency bandwidth for the purpose of precise measurement, and the burden of rising cost makes it impractical to manufacture high-performance sender and receiver having a wideband chip rate.

DISCLOSURE OF THE INVENTION

Therefore, the present invention has been made in view of the above-mentioned problems, and it is an object of the present invention to provide a method and an apparatus for channel estimation regarding electromagnetic wave multi-path characteristics between a sender and a receiver wherein, when a reception antenna receives a chirp signal, a narrowband chirp-shift-keying signal, which includes narrowband chirp signals repeated along a time axis, or a narrowband multiple center-frequency-chirp signal, which is the sum of chirp signals having various center frequencies, from the sender via a wave multi-path, the receiver multiplies the received signal by a repeated chirp signal used by the sender and the receiver for conversion into a individual frequency, which is proportional to time difference between the chirp signals, and uses it for electromagnetic wave multi-path channel estimation.

According to a first aspect of the present invention, there is provided a method for channel estimation regarding electromagnetic wave multi-path characteristics between a sender and a receiver by using a narrowband chirp-shift-keying signal or narrowband multiple center-frequency-chirp signal, the narrowband chirp-shift-keying signal having narrowband chirp signals repeated along a time axis, the narrowband multiple center-frequency-chirp signal being a sum of chirp signals having various center frequencies, the method including the steps of (a) multiplying a received composite signal by a narrowband chirp-shift-keying signal or narrowband multiple center-frequency-chirp signal generated by the receiver itself and outputting a sum of individual frequency components resulting from difference in distance of multiple paths for up-chirp and down-chirp signal portions of a chirp-shift-keying signal, respectively, the received composite signal being formed by generating narrowband chirp-shift-keying signals or narrowband multiple center-frequency-chirp signals by the sender, sending the signals by a transmission antenna, receiving the signals by a reception antenna of the receiver via a multi-path channel, superimposing the signals, and adding the signals; (b) multiplying outputs of the up-chirp and down-chirp signal portions of the sum of individual frequency components and calculating a tolerance frequency output; (c) compensating for a frequency tolerance of the sum of individual frequency components by using the tolerance frequency output and generating a frequency compensation output; (d) compensating for discontinuity of chirp-shift-keying signals resulting from use of the narrowband chirp-shift-keying signals or the narrowband multiple center-frequency-chirp signals regarding the frequency compensation output and generating a discontinuity compensation output having no discontinuity; (e) decomposing the discontinuity compensation output into individual multi-path signals by using a frequency analysis method; and (f) extracting an attenuation component and a time delay component caused by the multi-path channel from the individual multi-path signals by using a size of frequency components of each frequency.

According to a second aspect of the present invention, there is provided a method for channel estimation regarding electromagnetic wave multi-path characteristics between a sender and a receiver by using a wideband single chirp signal, the method including the steps of (a) multiplying a received composite signal by a chirp signal generated by the receiver itself and outputting a sum of individual frequency components resulting from difference in distance of multiple paths, the received composite signal being formed by generating wideband single chirp signals by the sender, sending the signals by a transmission antenna, receiving the signals by a reception antenna of the receiver via a multi-path channel, superimposing the signals, and adding the signals; (b) decomposing the sum of individual frequency components into individual multi-path signal components by using a frequency analysis method; and (c) extracting an attenuation component and a time delay component caused by the multi-path channel from the individual multi-path signals by using a size of frequency components of each frequency.

According to a third aspect of the present invention, there is provided an apparatus for channel estimation regarding electromagnetic wave multi-path characteristics between a sender and a receiver by using a narrowband chirp-shift-keying signal or narrowband multiple center-frequency-chirp signal, the narrowband chirp-shift-keying signal having narrowband chirp signals repeated along a time axis, the narrowband multiple center-frequency-chirp signal being a sum of chirp signals having various center frequencies, the apparatus including a sampling unit for multiplying a received composite signal by a narrowband chirp-shift-keying signal or narrowband multiple center-frequency-chirp signal generated by the receiver itself and outputting a sum of individual frequency components resulting from difference in distance of multiple paths for up-chirp and down-chirp signal portions of a chirp signal, respectively, the received composite signal being formed by generating narrowband chirp-shift-keying signals or narrowband multiple center-frequency-chirp signals by the sender, sending the signals by a transmission antenna, receiving the signals by a reception antenna of the receiver via a multi-path channel, superimposing the signals, and adding the signals; a frequency compensation unit for multiplying outputs of the up-chirp and down-chirp signal portions of the sum of individual frequency components outputted from the sampling unit to calculate a tolerance frequency output and compensating for a frequency tolerance of the sum of individual frequency components by using the tolerance frequency output to generate a frequency compensation output; a discontinuity compensation unit for compensating for discontinuity of the narrowband chirp-shift-keying signals or the narrowband multiple center-frequency-chirp signals resulting from use of the narrowband chirp-shift-keying signals or the narrowband multiple center-frequency-chirp signals regarding the frequency compensation output generated by the frequency compensation unit and generating a discontinuity compensation output having no discontinuity; a frequency analysis unit for decomposing the discontinuity compensation output generated by the discontinuity compensation unit into individual multi-path signals by using a frequency analysis method; and a channel estimation unit for extracting an attenuation component and a time delay component caused by the multi-path channel from the individual multi-path signals obtained by the frequency analysis unit by using a size of frequency components of each frequency.

According to a fourth aspect of the present invention, there is provided an apparatus for channel estimation regarding electromagnetic wave multi-path characteristics between a sender and a receiver by using a wideband single chirp signal, the apparatus including a sampling unit for multiplying a received composite signal by a chirp signal generated by the receiver itself and outputting a sum of individual frequency components resulting from difference in distance of multiple paths, the received composite signal being formed by generating wideband single chirp signals by the sender, sending the signals by a transmission antenna, receiving the signals by a reception antenna of the receiver via a multi-path channel, superimposing the signals, and adding the signals; a frequency analysis unit for decomposing the sum of individual frequency components outputted from the sampling unit into individual multi-path signal components by using a frequency analysis method; and a channel estimation unit for extracting an attenuation component and a time delay component caused by the multi-path channel from the individual multi-path signals obtained by the frequency analysis unit by using a size of frequency components of each frequency.

The present invention is directed to a method and an apparatus for channel estimation regarding electromagnetic wave multi-path characteristics between a sender and a receiver by using a chirp signal. When a reception antenna receives a chirp signal, a chirp-shift-keying signal, or a narrowband multiple center-frequency-chirp signal, which has an integer number of different center frequencies, from the sender via a wave multi-path as a multi-path mixed chirp signal, the receiver analyzes the received signal and estimates channel characteristics regarding the wave multi-path. When two chirp signals having a time difference are multiplied, the output value is characteristically converted into a individual frequency, which is proportional to time difference between the chirp signals, and the energy of the individual frequency is characteristically proportional to the size of multi-path components. It is the key feature of the channel characteristic estimation method and apparatus according to a preferred embodiment of the present invention to use such characteristics for electromagnetic wave multi-path channel estimation.

The receiver multiplies the received multi-path mixed chirp signal by a chirp signal used by the sender and the receiver and analyzes the received signal. The chirp signal used for this analysis may be a chirp-shift-keying signal obtained by repeating a chirp signal, which has a predetermined frequency bandwidth, along a time axis an integer times or a narrowband multiple center-frequency-chirp signal, which has an integer number of different center frequencies. This provides the same effect as when a wideband single chirp signal is used for channel characteristic estimation.

The present invention also proposes a method and an apparatus for removing a channel estimation error resulting from a frequency tolerance of a local oscillator between a sender and a receiver.

In addition, the present invention proposes a method and an apparatus for removing a channel estimation error resulting from Doppler shift, which is caused by a difference in velocity between a sender and a receiver, regarding an up/down chirp signal pair, which simultaneously uses up-chirp/down-chirp, or a chirp-shift-keying signal.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Figure 1:
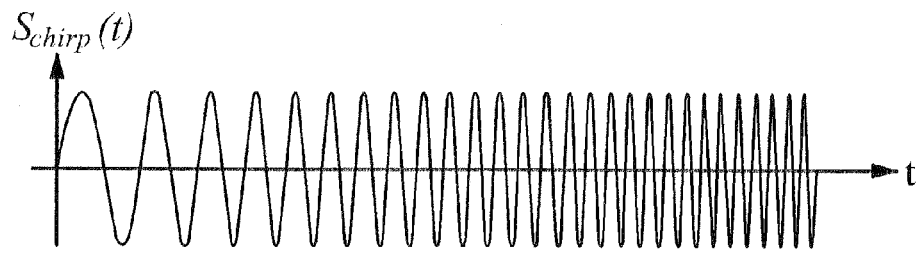
FIGS. 1 and 2 are graphs showing basic chirp signals.
Figure 1:
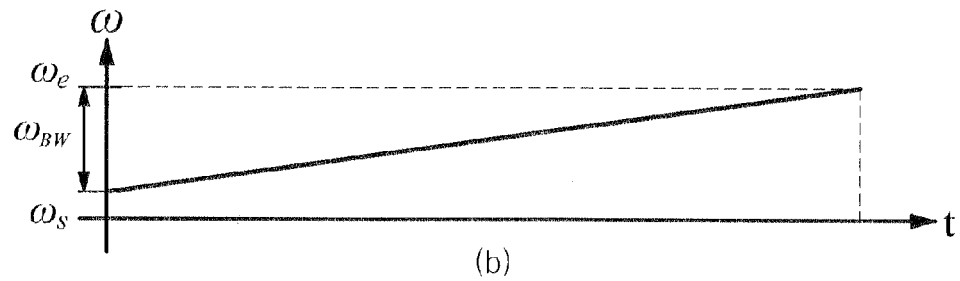

Hereinafter, a preferred embodiment of the present invention will be described with reference to the accompanying drawings. In the following description and drawings, the same reference numerals are used to designate the same or similar components, and so repetition of the description on the same or similar components will be omitted. Furthermore, a detailed description of known functions and configurations incorporated herein is omitted to avoid making the subject matter of the present invention unclear.

Figure 2:
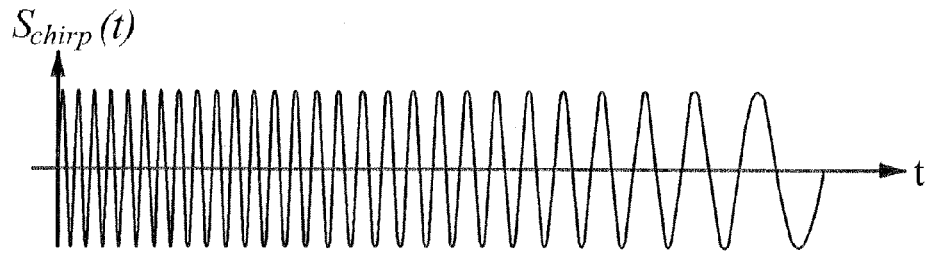
Figure 2:
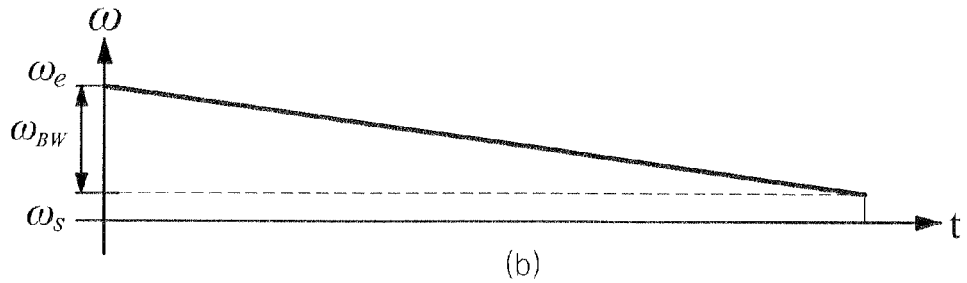

FIGS. 1 and 2 are graphs showing basic chirp signals.

Basic chirp signals used for channel estimation regarding electromagnetic wave multi-path characteristics between a sender and a receiver according to a preferred embodiment of the present invention are given in FIGS. 1 and 2.

Referring to FIG. 1, the chirp signal is a sinusoidal signal, which is characterized in that its instantaneous frequency sweeps linearly as time elapses.

In FIGS. 1 and 2, $\omega_s$ is the lowest instantaneous angular frequency of the chirp signal, $\omega_e$ is the highest instantaneous angular frequency of the chirp signal, and $\omega_{BW}$ ($\omega_{BW}=\omega_e-\omega_s$) is the total amount of change of the instantaneous angular frequency of the chirp signal and is referred to as the chirp's frequency bandwidth.

In FIG. 1, (a) shows an example of the waveform of the chirp signal along a time axis, and (b) depicts an example of the characteristics of the chirp signal along both time and frequency axes. It is clear from (b) that the frequency of the chirp signal linearly changes with time. The chirp signal having a shape as shown in FIG. 1 is referred to as an up-chirp signal.

In contrast, when the frequency of a signal decreases linearly with time, the signal is referred to as a down-chirp signal, the characteristics of which are shown in FIG. 2.

The up-chirp signal can be mathematically expressed by Equation 1.

$$\tilde{S}_{chirp}(t) = \exp\left[j\left(\omega_s + \frac{\omega_{BW}}{2T_{chirp}}t\right)t\right] \times p(t) \qquad \text{Equation 1}$$

In Equation 1, $T_{chirp}$ is duration of the chirp signal, and $p(t)$ is a windowing function of the chirp signal. As the windowing function, a rectangular function or raised cosine function is generally used, but the type is not limited to that herein.

The mathematical expression of the down-chirp signal is given as Equation 2.

$$\tilde{S}_{chirp}(t) = \exp\left[j\left(\omega_s - \frac{\omega_{BW}}{2T_{chirp}}t\right)t\right] \times p(t) \qquad \text{Equation 2}$$

Figure 3:
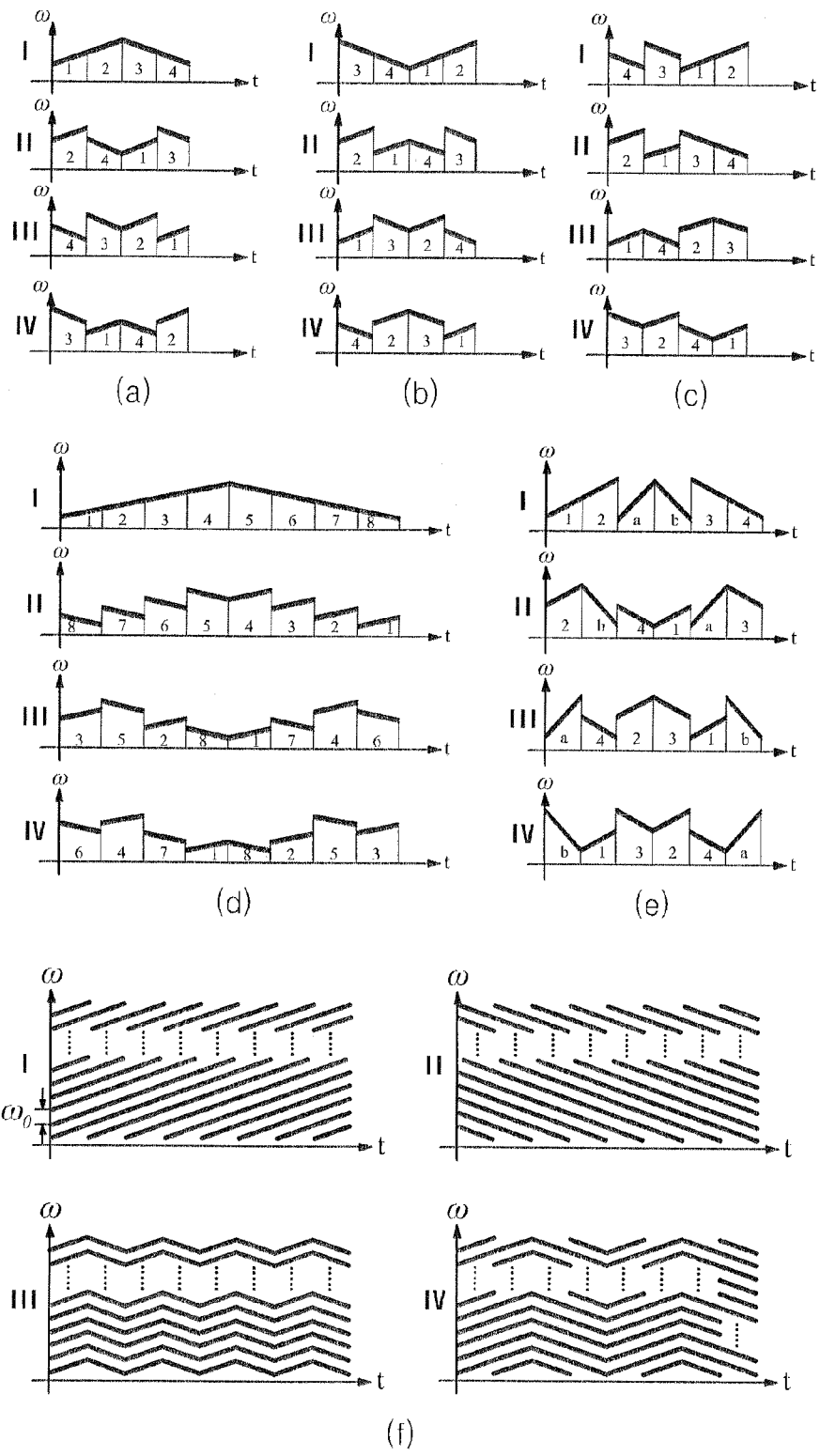
FIG. 3 shows examples of a narrowband chirp-shift-keying signal and a narrowband multiple center-frequency-chirp signal according to a preferred embodiment of the present invention.

FIG. 3 shows examples of a narrowband chirp-shift-keying signal and a narrowband multiple center-frequency-chirp signal according to a preferred embodiment of the present invention.

As used herein, a chirp-shift-keying signal refers to a signal obtained by dividing a combined signal of up-chirp/down-chirp or by dividing the frequency band into a number of sub-chirp signals and re-coupling the sub-chirp signals. Use of the chirp-shift-keying signal removes measurement errors resulting from errors between crystal oscillators which are used for the sender and the receiver, respectively. In addition, a low correlation property between signals makes it possible to separately receive signals even when they are sent from the same distance. The chirp-shift-keying signal will be described later in more detail.

In FIG. 3, (a) shows four examples of a chirp-shift-keying signal, which includes four sub-chirps (1, 2, 3, 4 in the drawing) obtained by bisecting the entire frequency band, doubling resulting up/down sub-chirps, and recombining them in different orders. In addition, (b) and (c) of FIG. 3 show further examples obtained similarly as in the case of (a). The chirp-shift-keying signals, which are constructed as above, have common characteristics that they use the entire frequency band components and have low correlations between them.

In FIG. 3, (d) and (e) show additional examples of chirp-shift-keying signals. Particularly, (d) provides four examples of a chirp-shift-keying signal, which includes eight sub-chirps (1, 2, 3, 4, 5, 6, 7, 8 in the drawing) obtained by dividing an entire frequency band into four parts, increasing the number of resulting up/down sub-chirps to four, respectively, and recombining them in different orders. In addition, (e) provides four examples of a chirp-shift-keying signal, which includes six full-chirps/sub-chirps (1, 2, 3, 4, a, b in the drawing) obtained by bisecting the entire frequency band, doubling resulting up/down sub-chirps, adding two up/down full-chirps having different frequency-time slopes $\mu$ ($\mu=\omega_{BW}/T_{chirp}$), and recombining them in different orders.

In FIG. 3, (f) shows examples of a narrowband multiple center-frequency-chirp signal having an integer number of different center frequencies. According to a preferred embodiment of the present invention, a narrowband multiple center-frequency-chirp signal is obtained by superimposing sub-chirps, which have different frequency bands, in a single sub-chirp period and composing a wideband chirp-signal equivalently. A mathematical expression of the narrowband multiple center-frequency-chirp signal is given in Equation 3.

$$\varphi_k(t) = e^{j\left(k\omega_0 t + \frac{\mu}{2} t^2\right)} \qquad \text{Equation 3}$$

$$\frac{1}{T} = \int_0^T \varphi_m(t)\varphi_n^*(t)dt = \frac{1}{T}\int_0^T e^{(m-n)\omega_0 t}dt = \begin{cases} 1(m=n) \\ 0(m \neq n) \end{cases}$$

$$\text{Chirp}(t) = \sum_{k=0}^{N-1} \tilde{a}_k \varphi_k(t) = \sum_{k=0}^{N-1} \tilde{a}_k e^{j\left(k\omega_0 t + \frac{\mu}{2} t^2\right)}$$

Wherein, $\phi_k(t)$ refers to a signal indicating a sub-chirp, and $\omega_0$ refers to a frequency gap between sub-chirps having different frequency bands. Referring to the second formula in Equation 3, $\phi_k(t)$ is characterized in that the integral value becomes 1 when index m and n are identical and the integral value becomes 0 when m and n are different. As such, $\phi_k(t)$ constitutes an orthogonal basis function set. These characteristics are very similar to those of Fourier transform.

Summation of $\phi_k(t)$ function provides Chirp(t), which is shown in (f) of FIG. 3 along time (t) and frequency axes. The Chirp(t) of Equation 3 has autocorrelation characteristics, which are very similar to that of a single wideband chirp-signal, and this signal is characterized in that it makes it easy to generate an ultra-wideband chirp-signal in a digital signal processing method. The chirp-signal set of $\phi_k(t)$ can replace the sine-wave signal set of an OFDM (orthogonal frequency division multiplex), which is widely used for conventional communication.

In summary, FIG. 3 shows four examples of a method for combining signals by using multiple chirps obtained by superimposing up/down sub-chirps, which have different frequency bands, all in a single sub-chirp period and composing a wideband chirp-signal equivalently.

In addition to the above-mentioned signal combination methods, signals can also be generated by varying the frequency slope size of the chirp-signal, direction, bandwidth, and order of combining these factors.

As mentioned above, in order to eliminate measurement errors resulting from errors between crystal oscillators used for the sender and the receiver, respectively, up/down chirps should use entire frequency band components at the same time. It is clear from FIG. 3 that all signals shown in FIG. 3 meet this requirement. This means that, according to a preferred embodiment of the present invention, chirp-shift-keying signals are provided by recombining full-chirp/sub-chirps having various frequency-time slopes ($\mu = \omega_{BW}/T_{chirp}$), particularly $\mu_1, \mu_2, \ldots \mu_M$, in different orders.

Figure 4A:
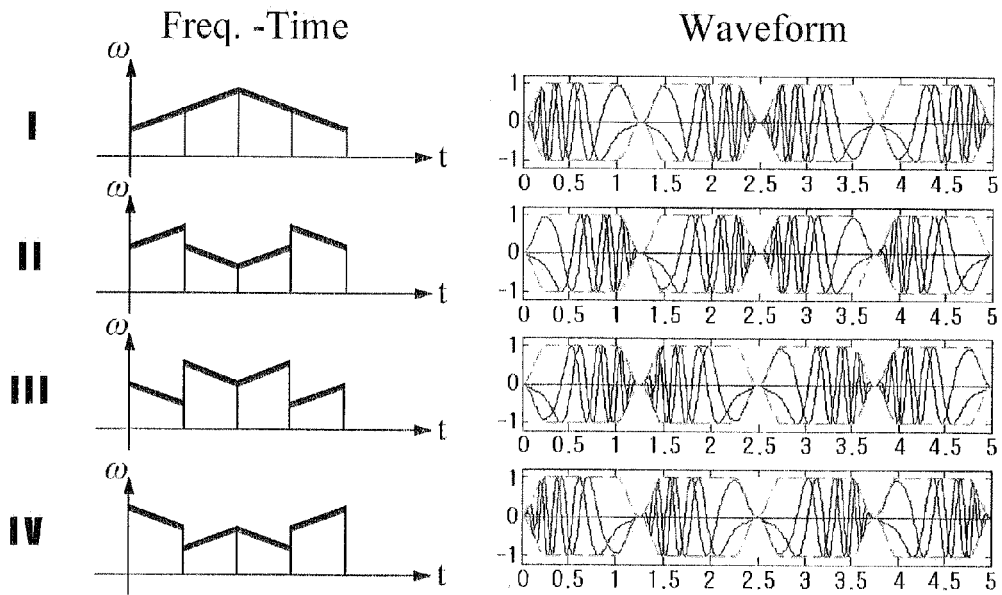
FIG. 4*a* shows waveforms of a narrowband chirp-shift-keying signal along a time axis.
Figure 4B:
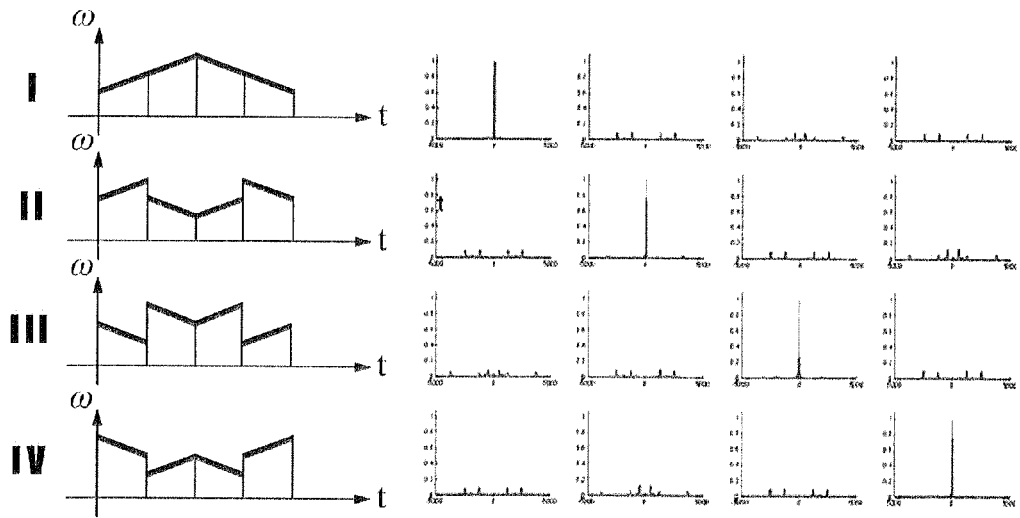
FIG. 4*b* shows the result of cross-correlation of a narrowband chirp-shift-keying signal along a time axis.

FIG. 4a shows waveforms of the narrowband chirp-shift-keying signal, which is given in (a) of FIG. 3, along a time axis. FIG. 4b shows the result of cross-correlation of the narrowband chirp-shift-keying signal, which is given in (a) of FIG. 3, along a time axis. It is clear from FIG. 4b that, when two chirp signals coincide with each other at the same point of time, the cross-correlation has a maximum value and, when there is a discrepancy between their positions in the left or right direction, the cross-correlation has a rather small value. The cross-correlation values of all chirp-shift-keying signals shown in FIG. 3 have similar characteristics as in the case of FIG. 4b.

The channel estimation technology regarding electromagnetic wave multi-path characteristics between a sender and a receiver according to a preferred embodiment of the present invention aims at extracting parameters of a wave multi-path model.

A mathematical expression of a conventional wave multi-path model is given in Equation 4.

$$c(t) = \sum_{i=1}^L a_i \delta(t - \tau_i) e^{j\theta_i} \qquad \text{Equation 4}$$

Wherein, L refers to the number of multiple paths, $\alpha_i$ refers to an attenuation coefficient for each path, $\delta(t)$ refers to Dirac's delta function, $\tau_i$ refers to time delay for each path, and $\theta_i$ refers to phase shift resulting from paths. The channel estimation technology helps extract all or part of the parameters in Equation 4, i.e. $\alpha_i$, $\tau_i$, and $\theta_i$, from signals received by an antenna via multiple paths.

In order to obtain a multi-path mixed chirp signal, which is formed by receiving signals by an antenna via multiple paths, a convolution of Equations 1 and 4 is taken. The result is given in Equation 5.

$$\tilde{r}(t) = \sum_{i=1}^L a_i \exp\left[j\left(\omega_s + \frac{\omega_{BW}}{2T_{chirp}}(t-\tau_i)\right)(t-\tau_i)\right] e^{j\theta} \times p(t-\tau_i) \qquad \text{Equation 5}$$

Figure 5:
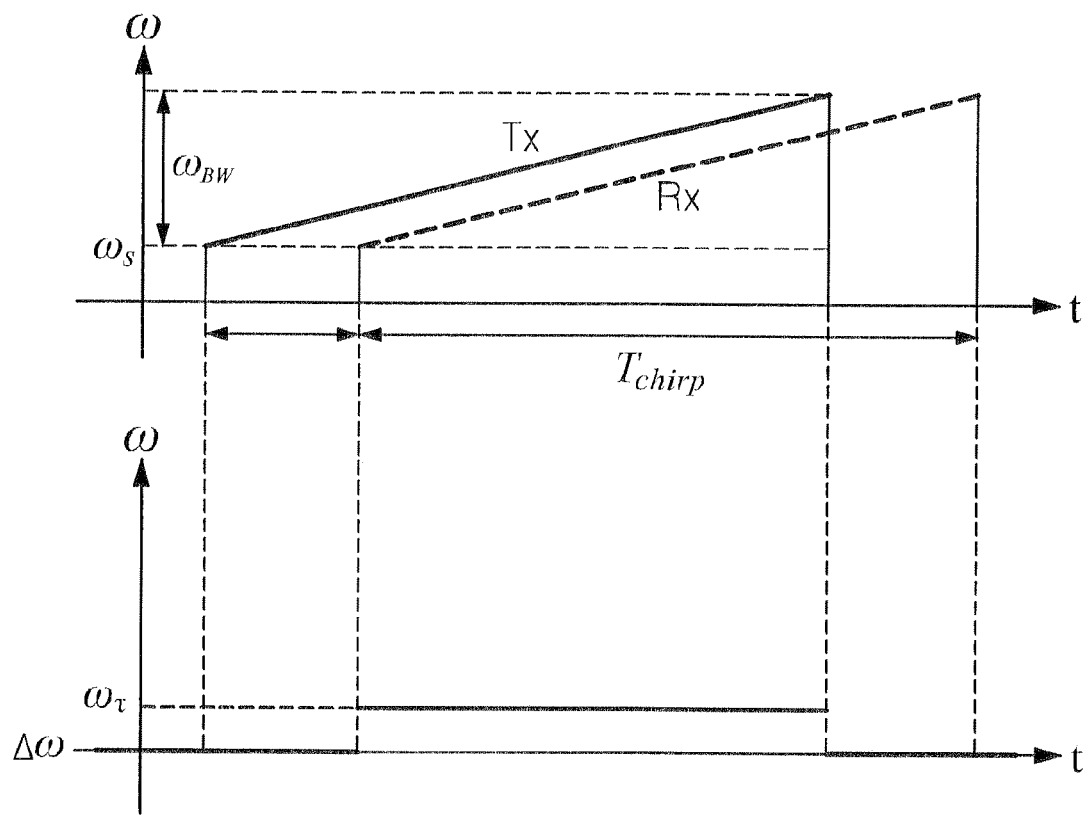
FIG. 5 shows a sent chirp signal and a delayed chirp signal according to a preferred embodiment of the present invention.

FIG. 5 shows a sent chirp signal and a delayed chirp signal according to a preferred embodiment of the present invention.

Assuming that only one of multiple paths exits, a chirp signal Tx (indicated by a solid line in FIG. 5) is sent and, after being attenuated and delayed, a chirp signal Rx (indicted by dotted lines in FIG. 5) is received.

Referring to FIG. 5, when the sent signal Tx and the received signal Rx (delayed by $\tau$) are multiplied, a frequency component $\omega_\tau$ is outputted in proportion to delay time from a part of the time axis where two chirp signals overlap each other. This is mathematically expressed in Equation 6.

$$\tilde{s}_{chirp}(t) \times [\alpha \times \tilde{s}_{chirp}^*(t-\tau)e^{j\theta}] = \qquad \text{Equation 6}$$

$$\alpha \times \exp\left[j\left(\frac{\omega_{BW}}{T_{chirp}}\tau \times t + \left(\omega_s \tau - \frac{\omega_{BW}}{2T_{chirp}}\tau^2\right) + \theta\right)\right] \times p(t)p(t-\tau)$$

The frequency component of Equation 6 is given in Equation 7, and the time delay value of the chirp signal is outputted in terms of frequency proportional to that value. Particularly, the time delay is linearly proportional to the outputted frequency.

$$\omega_\tau = \frac{\omega_{BW}}{T_{chirp}}\tau \qquad \text{Equation 7}$$

Referring back to Equation 6, the size of the delayed signal undergoes no change. This method enables extraction of major parameters of the signal which has been attenuated and delayed by the channel, particularly $\alpha$ (attenuation component), $\tau$ (time delay component), and $\theta$ (phase shift component).

In order to apply the same principle in the case of the signal expressed by Equation 5, the signal having been obtained by sending a signal and receiving it by an antenna via multiple paths, the multi-path mixed chirp signal of Equation 5 is multiplied by the same chirp signal as has been sent. As a result, respective multi-path components, each having different time delays, are outputted as the sum of different frequency components (in proportion to time delay). In addition, the size of respective frequency components, when outputted, is proportional to the attenuation values given by the channel. Since the multi-path components, which have been added at the output, have different frequency components, it is possible to decompose them into individual multiple paths in a frequency analysis method (e.g. fast Fourier transform). This process provides estimation of major parameters of the channel, particularly $\alpha_i$ (attenuation component), $\tau_i$ (time delay component), and $\theta_i$ (phase shift component). In addition, the product of the estimated time delay value and the velocity of the electromagnetic wave is useful for ranging. This process will be described later in more detail.

Figure 6:
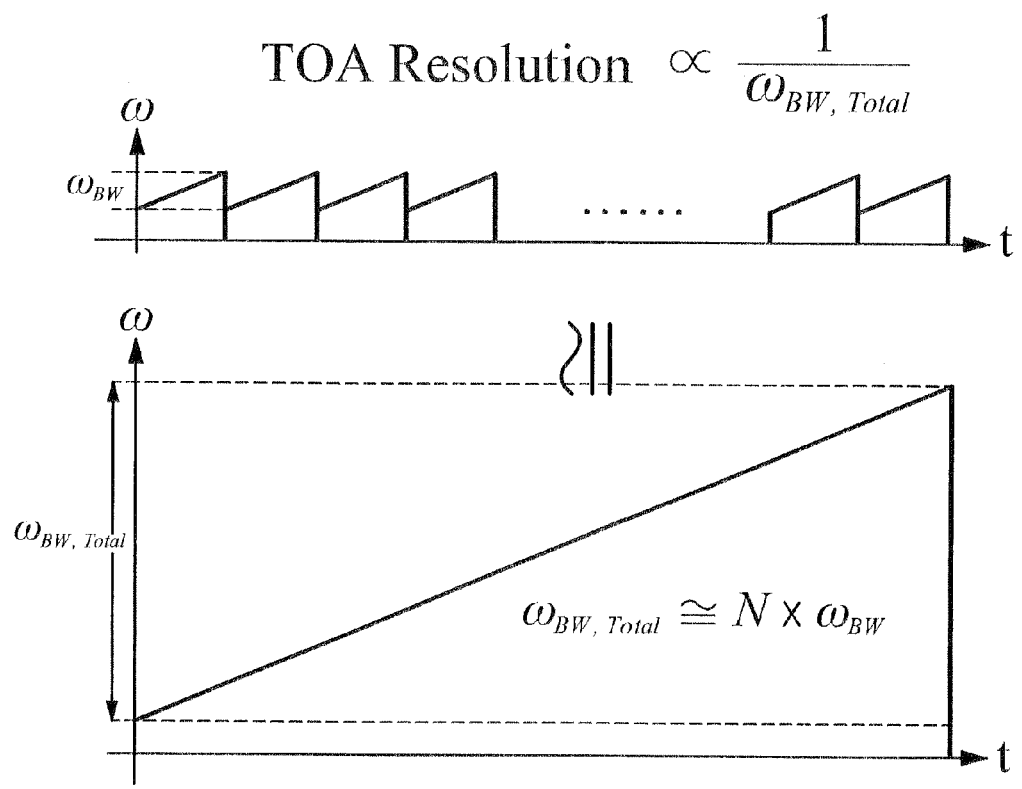
FIG. 6 illustrates the correlation between a repeated narrowband chirp signal and a single wideband chirp signal.

FIG. 6 illustrates the correlation between a repeated narrowband chirp signal and a single wideband chirp signal.

In general, the accuracy of time delay estimation using electromagnetic waves is inversely proportional to the frequency bandwidth of signals used for measurement. For example, in order to obtain a time delay measurement accuracy of 1 nano-second or less, at least 1 GHz of frequency bandwidth needs to be used. However, if a signal frequency bandwidth of 1 GHz is used, available frequency range becomes extremely limited. Furthermore, in the case of digital implementation, the required power consumed by an A/D converter and a signal processing unit, for the sake of signal sampling, soars. When a frequency bandwidth of 20 MHz is used, the time delay measurement accuracy is as large as 50 nano-seconds (i.e. the measurement accuracy is poor). In contrast, the rate of the A/D converter and the signal processing unit, which are used for sampling, is reduced to 1/50. As a result, the volume of calculation and the complexity of implemented circuits decreases, so does the power consumption.

In the case of a chirp signal, its instantaneous frequency sweeps the entire frequency bandwidth from minimum to maximum values for duration time (in the case of up-chirp). A time value of the chirp signal is convertible to a frequency corresponding to that time, and vice versa. Such chirp characteristics are extended to obtain repeated chirp signals by repeating a chirp signal, which has a narrowband $\omega_{BW}$, an integer number of times or a narrowband multiple center-frequency-chirp signal by superimposing narrowband chirp signals along a time axis and adding them. The resulting signal has the same effect as when a wideband single chirp signal having a bandwidth of $N \times \omega_{BW}$ is equivalently used for channel characteristic estimation. In addition, the A/D converter and the signal processing unit for sampling may have a low rate. Particularly, time delay characteristics can be measured precisely to be applied to ranging between a sender and a receiver, short-distance RADAR (radio detection and ranging), etc.

It is clear from the above example that, in order to measure time delay of 1 nsec, 50 chirp signals of 20 MHz may be used to obtain the same accuracy which are equivalent to one 1 GHz signal. This result can be used to improve the measurement accuracy of TOA (time-of-arrival).

FIG. 6 illustrates the above-mentioned process. More particularly, when a chirp signal is used as in the case of FIG. 5, the product of a reference chirp signal and a chirp signal having time delay renders a frequency component outputted in proportion to that delay time. When a chirp signal is repeatedly used to obtain repeated chirp signals (shown in the upper portion of FIG. 6), their characteristics are equivalent to those of a single chirp signal (shown in the lower portion of FIG. 6) having a frequency bandwidth, which is N times as large as that of the original chirp signal. So is the case of a chirp-shift-keying signal.

Namely, not only a wideband single chirp signal, but also a narrowband chirp-shift-keying signal and a narrowband multiple center-frequency-chirp signal are used according to a preferred embodiment of the present invention.

A repeated chirp signal, which has been sampled in this manner, can be mathematically expressed as in Equation 8.

$$\tilde{s}_\Sigma(m) = \sum_{k=0}^{N-1} \exp\left[j\left(\omega_s + \frac{\omega_{BW}}{2T_{chirp}}(mT_s - kT)\right)(mT_s - kT)\right] \times p(m,k) \quad \text{Equation 8}$$

Wherein, $p(m,k) = u(mT_s - kT) - u(mT_s - (K+1)T)$
$u(t)$: unit step function

Figure 7:
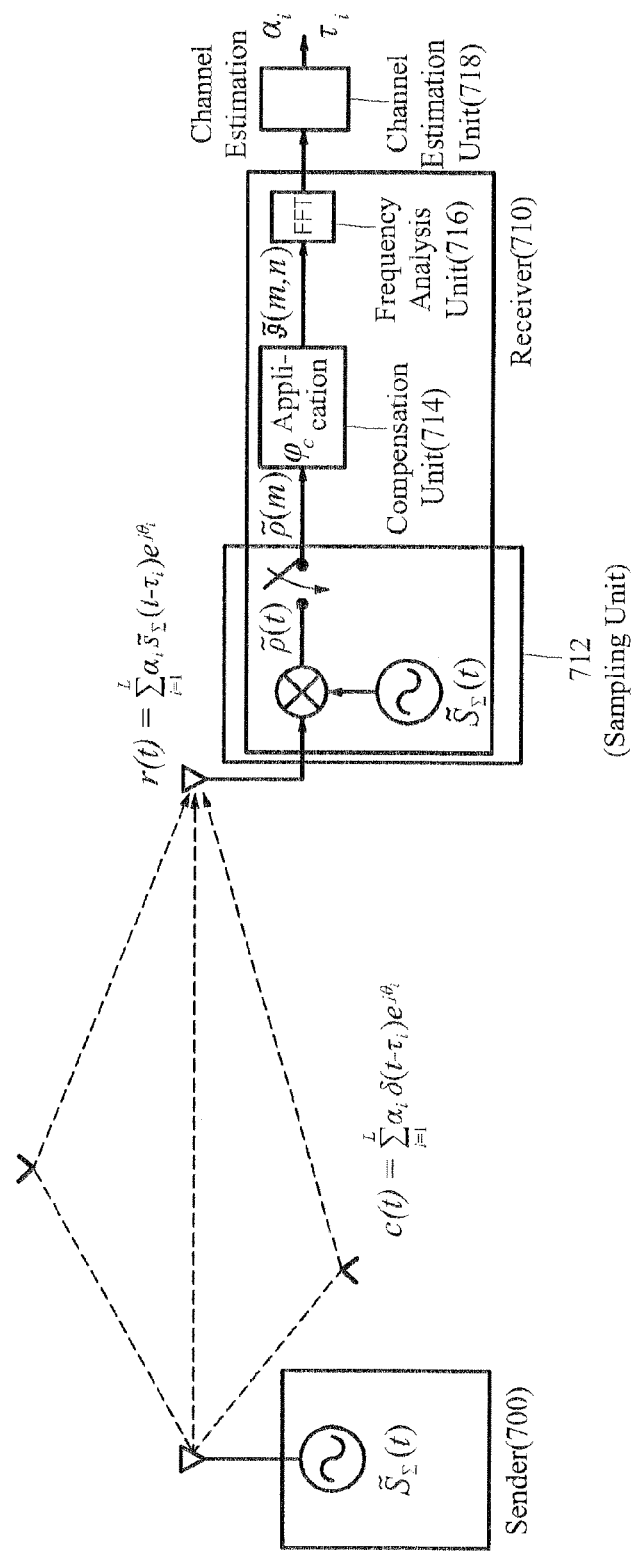
FIG. 7 shows a channel estimation apparatus for estimating a channel regarding electromagnetic wave multi-path characteristics between a sender and a receiver by using a chirp signal according to a preferred embodiment of the present invention.

FIG. 7 shows a channel estimation apparatus for estimating a channel regarding electromagnetic wave multi-path characteristics between a sender and a receiver by using a chirp signal according to a preferred embodiment of the present invention.

As shown in FIG. 7, a channel estimation apparatus for estimating a channel regarding electromagnetic wave multi-path characteristics between a sender and a receiver by using a chirp signal according to a preferred embodiment of the present invention includes a sampling unit 712, a compensation unit 714, a frequency analysis unit 716, and a channel estimation unit 718.

When a sender 700 sends repeated chirp signals or repeated chirp-shift-keying signals, the signals reach a receiver 710 via a direct path, along which the signals are directly inputted to the receiver, or via a reflected path, along which the signals are reflected by an object. After reaching the receiver 710, the signals add up at the antenna of the receiver 710 and are inputted to the sampling unit 712. The receiver 710 analyzes the received composite signal, which has been received via multiple paths in this manner, and extracts major parameters of the channel, particularly $\alpha_i$ (attenuation component), $\tau_i$ (time delay component), and $\theta_1$ (phase shift component).

The sampling unit 712 according to a preferred embodiment of the present invention multiplies the received composite signal, which has been formed by generating narrowband chirp-shift-keying signals by the sender 700, sending them by a transmission antenna, receiving them by a reception antenna of the receiver 710 via a multi-path channel, superimposing them, and adding them, by a repeated chirp signal, which has been generated by the sender 710 itself. The resulting sum of individual frequency components based on the difference in distance of the multiple paths is produced as $\bar{\rho}(m)$.

The compensation unit 714 according to a preferred embodiment of the present invention compensates for discontinuity of chirp signals, which results from use of narrowband chirp-shift-keying signals, regarding the sum of individual frequency components outputted from the sampling unit 712 and generates a compensated output $\bar{\theta}(m,n)$, which has no discontinuity. A discontinuity compensation factor $\phi_c$ is used for that compensation. According to a preferred embodiment of the present invention, the discontinuity compensation factor is determined by at least one of frequency bandwidth, duration time, and repetition method of the narrowband chirp-shift-keying signal.

The frequency analysis unit 716 according to a preferred embodiment of the present invention uses a frequency analysis method and decomposes the compensated output from the compensation unit 714 into individual multi-path signal components. Particularly, the compensated output is separated into respective frequency components using a frequency analysis method, such as FFT (fast Fourier transform), so that the size and phase value of the respective frequency components are outputted.

The channel estimation unit 718 according to a preferred embodiment of the present invention extracts $\alpha_i$ (attenuation component), $\tau_i$ (time delay component), and $\theta_i$ (phase shift component), which result from the multi-path channel, from the individual multi-path signals, which have been obtained by the frequency analysis unit 716, by using the size of frequency components of each frequency. Particularly, respective frequency components are converted into corresponding path delay time components by the conversion formula of Equation 7. This process enable estimation of major parameters of the multiple paths, particularly $\alpha_i$ (attenuation component), $\tau_i$ (time delay component), and $\theta_i$ (phase shift component).

The channel estimation unit 718 extracts a time delay component which corresponds to a least frequency of the individual frequencies, and multiplies the extracted time delay component by the speed of light, in order to calculate the distance between the sender 700 and the receiver 710.

When a single wideband chirp signal is used instead of the narrowband chirp-shift-keying signal in the above-mentioned embodiment, the phase compensation process is unnecessary, and the compensation unit 714 may be omitted from the channel estimation apparatus shown in FIG. 7 without affecting its operation.

Figure 8:
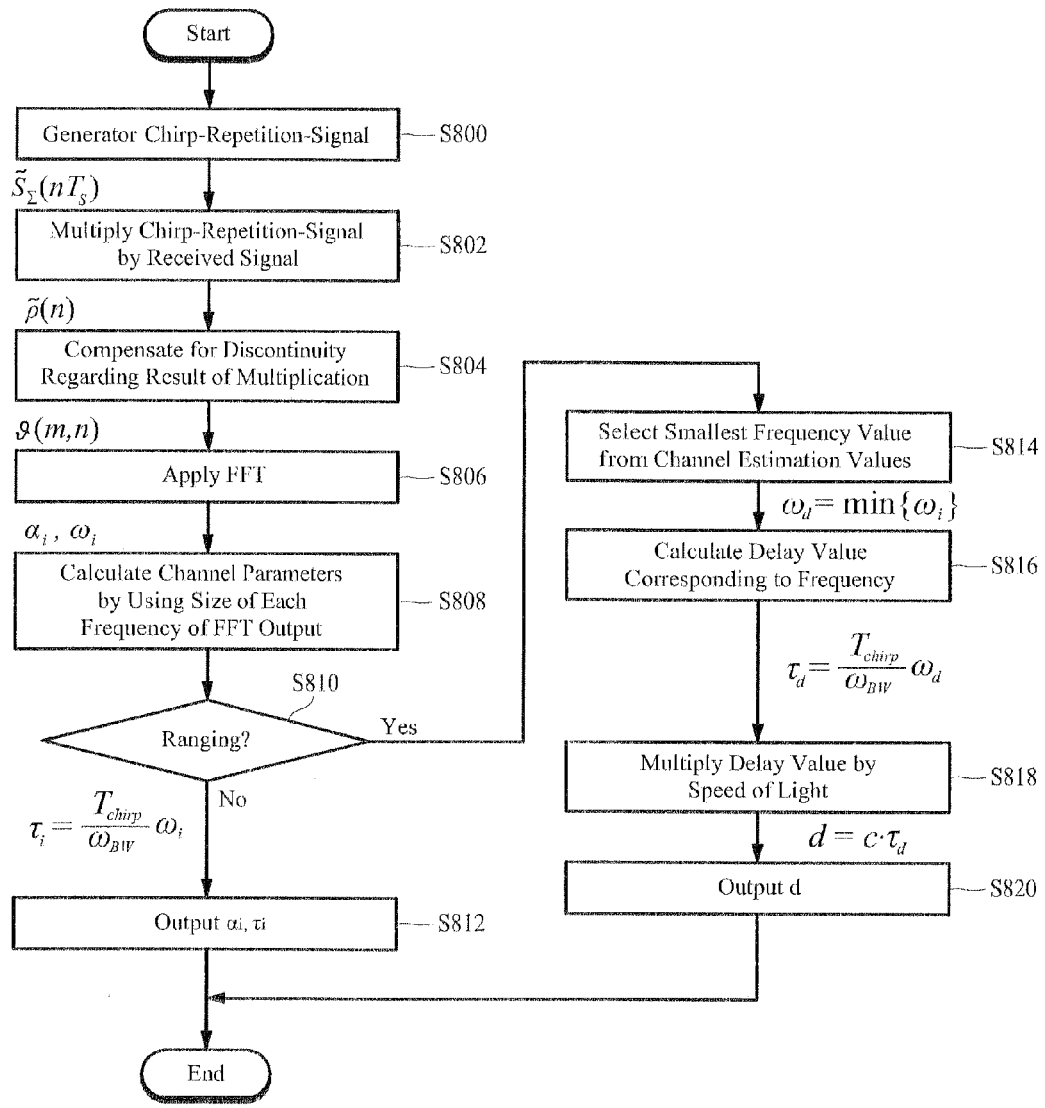
FIG. 8 is a flowchart showing a series of steps for estimating a channel regarding electromagnetic wave multi-path characteristics between a sender and a receiver by using a narrowband chirp-shift-keying signal and a narrowband multiple center-frequency-chirp signal according to a preferred embodiment of the present invention.

FIG. 8 is a flowchart showing a series of steps for estimating a channel regarding electromagnetic wave multi-path characteristics between a sender and a receiver by using a narrowband chirp-shift-keying signal and a narrowband multiple center-frequency-chirp signal according to a preferred embodiment of the present invention.

A received composite signal, which has been formed by generating narrowband chirp-shift-keying signals by the sender 700, sending them by a transmission antenna, receiving them by a reception antenna of the receiver 710 via a multi-path channel, superimposing them, and adding them, is multiplied by a repeated chirp signal, which has been generated by the sender 710 itself (S800), so that the sum of individual frequency components resulting from the difference in distance of the multiple paths is produced (S802).

The repeated chirp signal of Equation 8 and the signal of Equation 4 which has passed through the multi-path channel, are multiplied, sampled, and arranged to yield Equation 9.

$$\tilde{p}(m) = \tilde{s}_\Sigma(mT_s) \left[ \sum_{i=1}^{L} \alpha_i \tilde{s}_\Sigma(mT_s - \tau_i) e^{j\theta_i} \right]^* = \sum_{i=1}^{L} \alpha_i \left[ \sum_{i=1}^{N-1} e^{j\theta(m,k,i)} p(m, k, i) \right]$$

Equation 9

Wherein, $T_s$:sampling interval $$\theta(m, k, i) = \frac{\omega_{BW}}{T_{chirp}} \tau_i(mT_s - kT) + \omega_s \tau_i - \frac{\omega_{BW}}{2T_{chirp}} \tau_i^2 + \theta_i$$

Equation 9 gives the sum of individual frequency components resulting from the difference in distance of multiple paths.

The sum of individual frequency components obtained by Equation 9 is subjected to compensation, in order to compensate for discontinuity of chirp signals resulting from the use of narrowband chirp-shift-keying signals, and a compensated output, having no discontinuity, is generated (S804). Particularly, in order to extract frequency components proportional to delay time, from the result of Equation 9 by using a frequency analysis method (e.g. FFT), the discontinuity resulting from narrowband chirp-shift-keying signals should be compensated for. Equation 10 gives the result of such discontinuity compensation.

$$\tilde{\partial}(m, n) = \sum_{i=1}^{L} \alpha_i \left[ \sum_{k=0}^{N-1} e^{j\theta(m,k,i)} e^{jkm\varphi_c} p(m, k, i) \right]$$

Equation 10

Regarding the outputted sum of individual frequency components, respective multi-path components have different frequency components. By adding the discontinuous phase compensation factor $\phi_c$ of Equation 10, they can be decomposed into individual multiple paths by using a conventional frequency analysis method (e.g. FFT). As mentioned above, the phase compensation factor is determined by the frequency bandwidth of the chirp signal, duration time, repetition method, etc. Equation 10 gives an example wherein the number of multiple paths is L, the repetition period is T, and the chirp is repeated N times. $\omega_{BW}T_s$ can also be used.

When a single wideband chirp signal is used instead of the narrowband chirp-shift-keying signal, the above-mentioned phase compensation process becomes unnecessary.

After the discontinuity compensation, a frequency analysis method (e.g. FFT) is used to decompose the compensated output into individual multi-path signal components (S806).

By using the size of frequency components of each frequency of the individual multi-path signals, an attenuation component and a time delay component resulting from the multi-path channel can be extracted (S812).

The least frequency is selected from channel estimation values of the individual frequencies (S814), a corresponding time delay component is extracted (S816), and the extracted time delay component is multiplied by the speed of light (S818), so that the distance between the sender and the receiver is calculated (S820). Particularly, time delay characteristics can be precisely measured by using a mode according to a preferred embodiment of the present invention, to thereby apply them to ranging between a sender and a receiver, short-distance RADAR, etc.

When a single wideband chirp signal is used in place of the narrowband chirp-shift-keying signal in the above-mentioned embodiment, the phase compensation step (S804) becomes unessential, while other steps remain the same. Therefore, further description regarding use of a single wideband chirp signal will be omitted herein.

Among various factors affecting the accuracy of channel estimation, the most important one is frequency accuracy. In general, the sender does not always conform to a reference frequency, and there exists a frequency tolerance between two reference frequencies. This frequency tolerance tends to enlarge where an inexpensive crystal oscillator is employed. Such a frequency tolerance drops the accuracy of channel estimation values and degrades the performance.

In order to improve the accuracy of such a reference frequency, the present invention suggests a frequency stabilization method.

Figure 9:
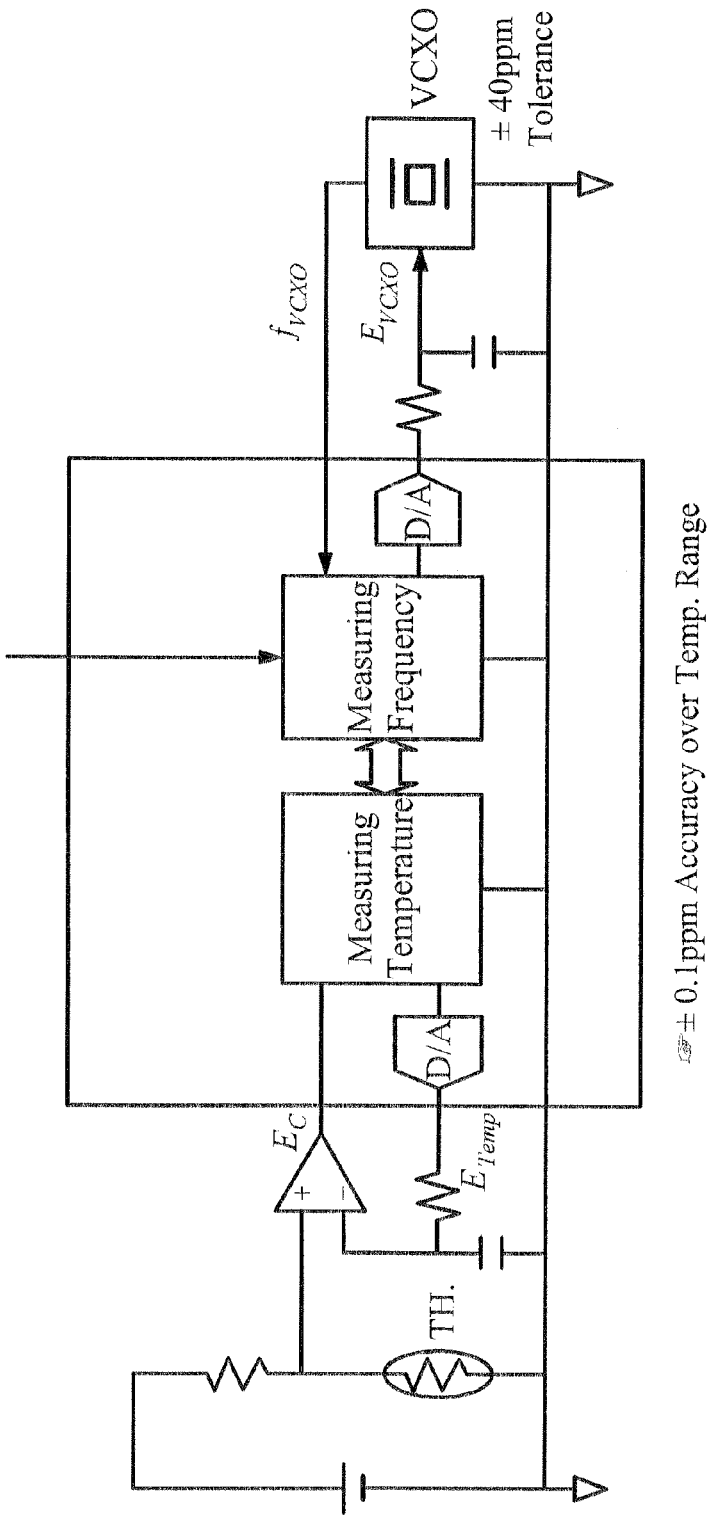
FIG. 9 shows a frequency adjustment apparatus for maintaining frequency precision according to a preferred embodiment of the present invention.

FIG. 9 shows a frequency adjustment apparatus for maintaining frequency precision according to a preferred embodiment of the present invention.

The frequency adjustment apparatus includes a digital signal processing unit shown in the center of FIG. 9, an ambient temperature measuring unit shown on the left, and a reference frequency generating and adjusting unit shown on the right.

Figure 10:
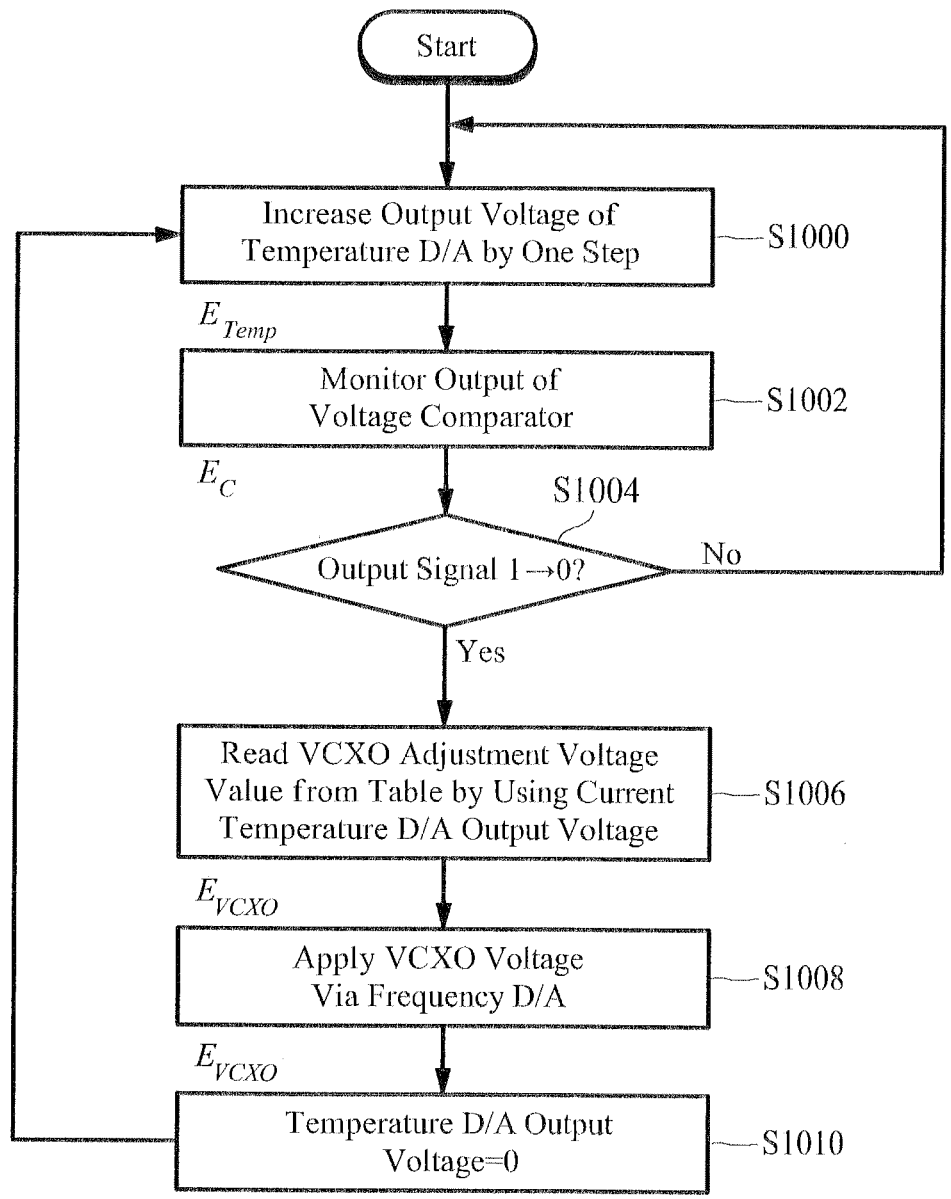
FIG. 10 is a flowchart showing a series of steps for maintaining frequency precision according to a preferred embodiment of the present invention.

The frequency adjustment apparatus will now be described with reference to the flowchart shown in FIG. 10.

The temperature measuring unit boosts DC voltage from low to high levels via a D/A by using the digital signal processing unit (S1000) and applies the voltage to a voltage comparator (S1002). The voltage comparator compares the voltage of a TH (thermistor) with that outputted from the D/A (S1004) and, when the voltage from the D/A is higher than that of the TH, toggles from +V voltage to 0 voltage.

The digital signal processing unit detects such change and obtains the voltage outputted to the D/A at that time. The obtained voltage conforms to the ambient temperature value. The measured temperature and a VCXO (voltage controlled crystal oscillator) adjustment voltage, which is pre-stored in an internal memory table, are used to adjust the VCXO on the right side (S1006-S1008). This yields a frequency output of high precision (e.g. 0.1 ppm) over a wide operating temperature range, even if the VCXO has a large frequency tolerance (e.g. 40 ppm).

It should be noted that a frequency tolerance may also occur due to a minute tolerance of reference frequencies between the sender and the receiver, or due to influence of Doppler frequency shift resulting from relative displacement between the sender and the receiver while they are moving. This may drop the accuracy of channel estimation values and degrade the channel estimation performance. In order to mitigate the influence of the frequency tolerance and improve the channel estimation precision, a second preferred embodiment of the present invention utilizes an up/down chirp signal, a chirp-shift-keying signal using an up/down chirp signal pair, or a narrowband multiple center-frequency-chirp signal. Examples of the chirp-shift-keying signal and the narrowband multiple center-frequency-chirp signal according to a preferred embodiment of the present invention have already been described with reference to FIGS. 3 and 4.

Figure 11:
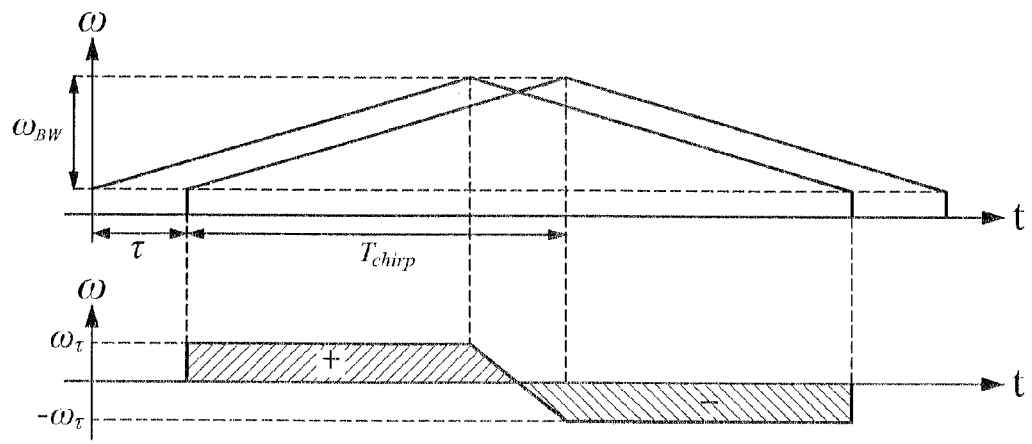
FIG. 11 shows an up-down chirp signal when there is no frequency tolerance.

FIG. 11 shows an up-down chirp signal when there is no frequency tolerance.

FIG. 11 gives an example of using an up/down chirp signal pair, and the same description holds when a chirp-shift-keying signal or narrowband multiple center-frequency-chirp signal is used. Particularly, the up/down chirp signal pair and the chirp-shift-keying signal commonly have a pair of up-chirp and down-chirp, and the following description is valid for both cases.

Two up/down chirp signals are superimposed and shown in the upper graph of FIG. 11. In the graph, the left signal has no delay, while the right signal shows a delayed of τ. The result of product of the pair of two up/down chirp signals is shown in the lower graph of FIG. 11. It is clear from the result that, regarding the tolerance frequency output, the up-chirp portion has (+) sign of frequency, and the down-chirp portion has (−) sign of frequency. When only time delay is involved as in this case, the (+) and (−) frequencies have the same size but different signs. This means that, when both frequencies are added, the resulting value is 0. In other words, when there is a time tolerance, but no tolerance of reference frequencies between the sender and the receiver (i.e. in the case of a balance), no compensation is necessary.

Figure 12:
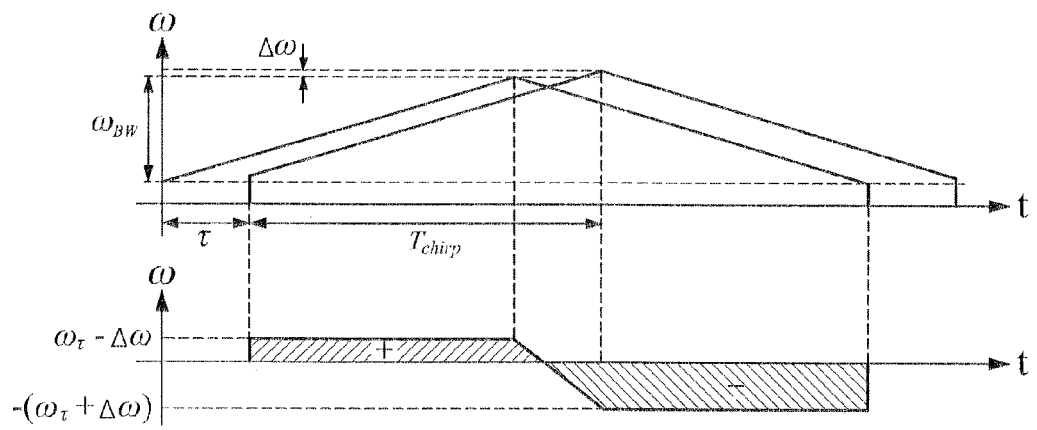
FIG. 12 shows an up-down chirp signal when there is a frequency tolerance.

FIG. 12 shows an up-down chirp signal when there is a frequency tolerance.

Two up/down chirp signals are superimposed and shown in the upper graph of FIG. 12. In the graph, the left signal has no delay, while the right signal shows a delay of τ and has made an upward parallel movement (Δω) from the frequency axis. Such a parallel movement of frequency of a signal occurs when there exists a reference frequency tolerance or Doppler frequency shift (i.e. in the case of an unbalance).

The result of product of the pair of two up/down chirp signals is shown in the lower graph of FIG. 12. It is clear from the result that, regarding the tolerance frequency output, the up-chirp portion has (+) sign of frequency, and the down-chirp portion has (−) sign of frequency. In this case, the (+) and (−) frequencies have difference in both signs and sizes. This means that, when the two frequencies are added, the result is 2Δω. This is referred to as a frequency deviation unbalance (Δω) and can be measured by means of Equation 6 or 9. Therefore, the measured tolerance frequency can be used to compensate for channel estimation values and improve the accuracy of time delay estimation values.

Figure 13:
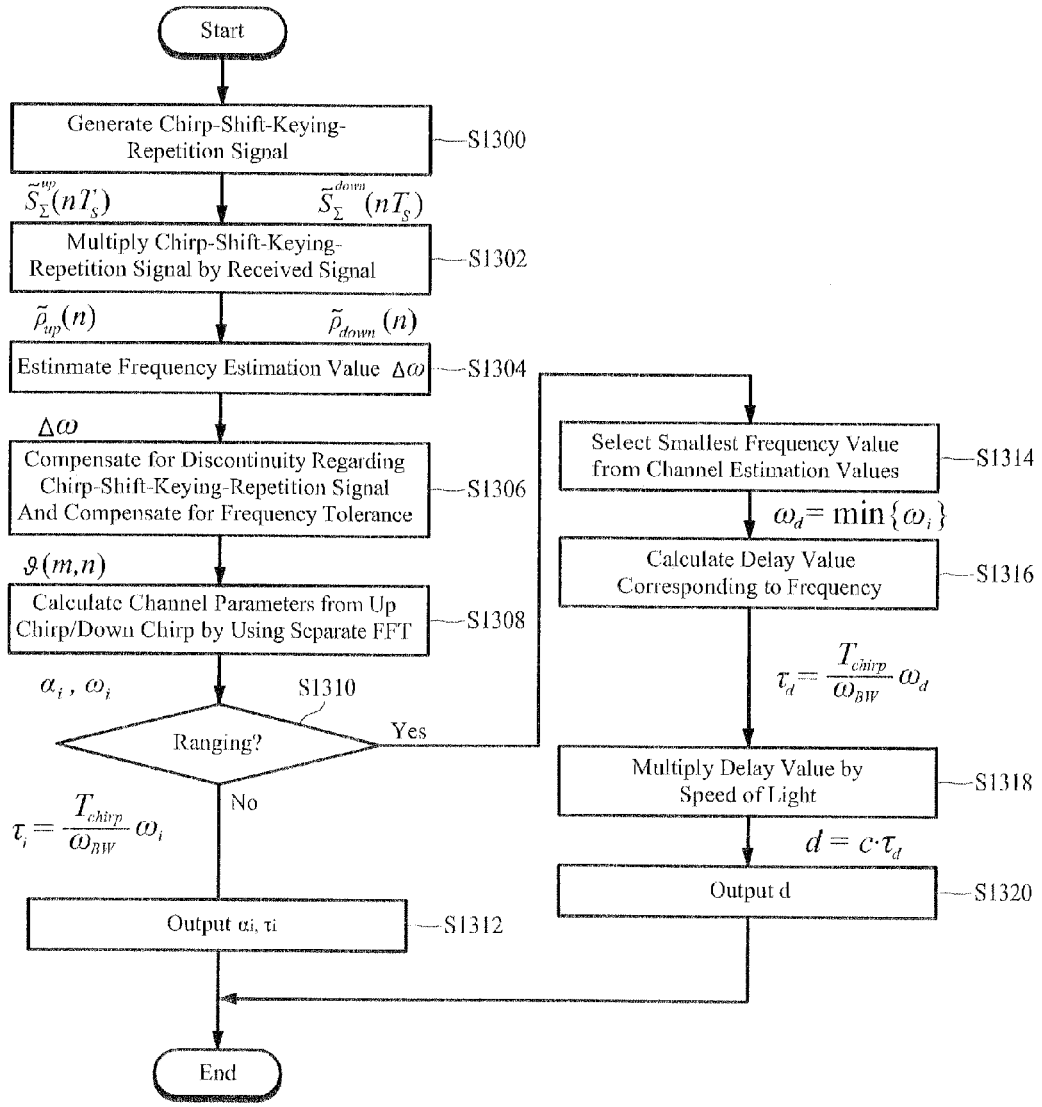
FIG. 13 is a flowchart showing a series of steps for estimating a channel regarding electromagnetic wave multi-path characteristics between a sender and a receiver by using a narrowband chirp-shift-keying signal according to a second preferred embodiment of the present invention.

FIG. 13 is a flowchart showing a series of steps for estimating a channel regarding electromagnetic wave multi-path characteristics between a sender and a receiver by using a narrowband chirp-shift-keying signal or narrowband multiple center-frequency-chirp signal according to a second preferred embodiment of the present invention.

A received signal, which has been formed by the procedure of generating narrowband chirp-shift-keying signals or narrowband multiple center-frequency-chirp signals by the sender, sending them by a transmission antenna, receiving them by a reception antenna of the receiver via a multi-path channel, superimposing them, and adding them, is multiplied by a narrowband chirp-shift-keying signal or narrowband multiple center-frequency-chirp signal, which has been produced by the sender (S1300), so that the sum of individual frequency components resulting from the difference in distance of the multiple paths is outputted for each of the up-chirp and down-chirp signal portions (S1302).

The outputted sum of individual frequency components of the up-chirp signal portion is multiplied by that of the down-chirp signal portion to calculate a frequency deviation unbalance Δω (S1304).

The discontinuity of chirp signals resulting from the use of narrowband chirp-shift-keying signals or narrowband multiple center-frequency-chirp signals is compensated for, and the frequency tolerance is compensated for by using the frequency deviation unbalance calculated in step S1304, in order to generate a compensated output (S1306).

For the discontinuity compensation, the same phase compensation factor as in Equation 10 is used for calculation and, for the frequency tolerance compensation, the same frequency deviation unbalance as described with reference to FIG. 12 is used for calculation. After compensating for the discontinuity and frequency tolerance, a conventional frequency analysis method (e.g. FFT) can be used for decomposition into individual multiple paths.

When a single wideband chirp signal is used instead of the narrowband chirp-shift-keying signal, the above-mentioned discontinuity compensation process becomes unnecessary.

After the compensation, a frequency analysis method (e.g. FFT) is used to decompose the compensated output into individual multi-path signal components (S1308).

By using the size of frequency components of each frequency of the individual multi-path signals, extraction of an attenuation component and a time delay component resulting from the multi-path channel is performed (S1312).

A least frequency is selected from channel estimation values of individual frequencies (S1314), a corresponding time delay component is extracted (S1316). The extracted time delay component is multiplied by the speed of light (S1318), to thereby calculate the distance between the sender and the receiver (S1320). Particularly, time delay characteristics can be measured precisely by using a mode according to a preferred embodiment of the present invention, so that application to ranging between a sender and a receiver, short-distance RADAR, etc. becomes practical.

Repeated narrowband chirp-shift-keying signals or narrowband multiple center-frequency-chirp signals which are sent by the sender 700 according to the second preferred embodiment of the present invention, are those obtained by combining full-chirp signals or sub-chirp signals having various frequency-time slopes, in various orders or by or repeatedly using them, as has been shown in FIG. 3.

When a single wideband chirp signal is used instead of the narrowband chirp-shift-keying signal in the above-mentioned embodiment, the phase compensation step becomes dispensable. Therefore, further description regarding use of a single wideband chirp signal will be omitted herein.

A channel estimation apparatus according to the second preferred embodiment of the present invention has a structure similar to that of the channel estimation apparatus described with reference to FIG. 7.

More particularly, a sampling unit according to the second preferred embodiment of the present invention is adapted to multiply a received composite signal which has been formed through the procedure of generating narrowband chirp-shift-keying signals or narrowband multiple center-frequency-chirp signals by the sender, sending them by a transmission antenna, receiving them by a reception antenna of the receiver via a multi-path channel, superimposing them, and adding them, by a narrowband chirp-shift-keying signal or a narrowband multiple center-frequency-chirp signal which has been produced by the sender, so that the sum of individual frequency components resulting from the difference in distance of the multiple paths is outputted for each of the up-chirp and down-chirp signal portions.

A compensation unit according to the second preferred embodiment of the present invention includes a frequency compensation unit and a discontinuity compensation unit. The frequency compensation unit multiplies the sum of individual frequency components of the up-chirp signal portion which has been outputted from the sampling unit, by that of the down-chirp signal portion and calculates a tolerance frequency output which is used to compensate for the frequency tolerance of the product of individual frequency components and generates a frequency compensation output. The frequency compensation is performed by using a frequency deviation unbalance, which is the sum of a frequency value corresponding to the up-chirp portion of the tolerance frequency output and that of the down-chirp portion. The discontinuity compensation unit is adapted to compensate for discontinuity of chirp-shift-keying signals, which results from the use of narrowband chirp-shift-keying signals, regarding the frequency compensation output generated by the frequency compensation unit, and generates a discontinuity compensation output, which has no discontinuity.

A frequency analysis unit according to the second preferred embodiment of the present invention uses a frequency analysis method and decomposes the discontinuity compensation output generated by the discontinuity compensation unit, into individual multi-path signals.

A channel estimation unit according to the second preferred embodiment of the present invention utilizes the size of respective frequency components of each frequency of the individual multi-path signals obtained by the frequency analysis unit, and extracts an attenuation component and a time delay component resulting from the multi-path channel.

The channel estimation unit according to the second preferred embodiment of the present invention is also adapted to extract a time delay component, corresponding to a least frequency of the individual frequencies, and multiply the extracted time delay component by the speed of light, in order to calculate the distance between the sender and the receiver.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

INDUSTRIAL APPLICABILITY

As can be seen from the foregoing, the present invention is advantageous in that post-signal processing of multiple chirp signals by the reception side makes it possible to obtain an estimation accuracy, which is inversely proportional to an integer number of times the frequency bandwidth of original chirp signals. In addition, precise measurement of time delay characteristics makes it possible to use estimated time delay values for application to ranging between a sender and a receiver, short-distance RADAR, etc.

By utilizing a chirp-shift-keying signal or narrowband multiple center-frequency-chirp signal, which uses both up-chirp and down-chirp, it is possible to remove channel estimation error resulting from Doppler shift, which is caused by relative displacement between the sender and receiver, for example. This improves the accuracy of time delay estimation values.

The invention claimed is:

1. A method for channel estimation regarding multi-path characteristics of electromagnetic wave between a sender and a receiver by using a narrowband chirp-shift-keying signal or a narrowband multiple center-frequency-chirp signal, the narrowband chirp-shift-keying signal having narrowband chirp signals repeated along an axis of time, the narrowband multiple center-frequency-chirp signal being a sum of chirp signals having various center frequencies, the method comprising the steps of:

(a) multiplying a received composite signal by the narrowband chirp-shift-keying signal or the narrowband multiple center-frequency-chirp signal generated by the receiver and outputting a sum of individual frequency components resulting from difference in distances of multiple paths for up-chirp signal portions and down-chirp signal portions of a chirp-shift-keying signal, respectively, the received composite signal being formed by superimposing and adding the narrowband chirp-shift-keying signals or the narrowband multiple center-frequency-chirp signals sent at a transmission antenna of the sender and received at a reception antenna of the receiver via a multi-path channel;

(b) multiplying outputs of the up-chirp signal portion and the down-chirp signal portions of the sum of individual frequency components to thereby produce a tolerance frequency output;

(c) compensating for a frequency tolerance of the sum of individual frequency components by using the tolerance frequency output to thereby generate a frequency compensation output;

(d) compensating for discontinuity of chirp-shift-keying signals resulting from use of the narrowband chirp-shift-keying signals or the narrowband multiple center-frequency-chirp signals regarding the frequency compensation output to thereby generate a discontinuity compensation output;

(e) decomposing the discontinuity compensation output into individual multi-path signals by using a frequency analysis method; and (f) extracting an attenuation component and a time delay component caused by the multi-path channel from the individual multi-path signals by using a size of frequency components of each frequency.

2. The method as claimed in claim 1, further comprising the steps of:

(g) extracting a time delay component corresponding to a least frequency of the individual frequencies; and (h) multiplying the time delay component extracted in step (g) by speed of light to calculate a distance between the sender and the receiver.

3. The method as claimed in claim 1, wherein a tolerance of reference frequencies between reference oscillators used for the sender and the receiver, respectively, is compensated for by measuring an ambient temperature of a crystal oscillator to improve accuracy of channel estimation.

4. The method as claimed in claim 1, wherein, in step (c), the frequency tolerance is compensated for by using a frequency deviation unbalance obtained by adding frequency values of up-chirp and down-chirp portions of the tolerance frequency output, respectively.

5. The method as claimed in claim 1, wherein the narrowband chirp-shift-keying signal is formed by combining full-chirp signals or sub-chirp signals having various frequency-time slopes in various orders.

6. The method as claimed in claim 1, wherein the narrowband chirp-shift-keying signal is formed by repeating or variously combining narrowband chirp signals along a time axis.

7. The method as claimed in claim 1, wherein the narrowband multiple center-frequency-chirp signal is formed by repeating or variously combining chirp-signals having various center frequencies.

8. The method as claimed in claim 1, wherein, in step (d), the discontinuity is compensated for by using a discontinuity compensation factor determined by at least one of frequency bandwidth, duration time, and repetition method of the narrowband chirp-shift-keying signal or narrowband multiple center-frequency-chirp signal.

9. A method for channel estimation regarding electromagnetic wave multi-path characteristics between a sender and a receiver by using a wideband single chirp signal, the method comprising the steps of:

(a) multiplying a received composite signal by a chirp signal generated by the receiver and generating a sum of individual frequency components resulting from difference in distance of multiple paths, the received composite signal being formed by superimposing and adding wideband single chirp signals generated by the sender and received by the receiver via a multi-path channel;

(b) decomposing the sum of individual frequency components into individual multi-path signal components by using a frequency analysis method; and (c) extracting an attenuation component and a time delay component caused by the multi-path channel from the individual multi-path signals by using a size of frequency components of each frequency.

10. The method as claimed in claim 9, further comprising the steps of:

(d) extracting a time delay component corresponding to a least frequency of the individual frequencies and (e) multiplying the time delay component extracted in step (d) by speed of light to calculate a distance between the sender and the receiver.

11. The method as claimed in claim 9, wherein a tolerance of reference frequencies between reference oscillators used for the sender and the receiver, respectively, is compensated for by measuring an ambient temperature of a crystal oscillator to improve accuracy of channel estimation.

12. An apparatus for performing channel estimation for electromagnetic wave multi-path characteristics between a sender and a receiver by using a narrowband chirp-shift-keying signal or narrowband multiple center-frequency-chirp signal, the narrowband chirp-shift-keying signal having narrowband chirp signals repeated along a time axis, the narrowband multiple center-frequency-chirp signal being a sum of chirp signals having various center frequencies, the apparatus comprising:

a sampling unit for multiplying a received composite signal by a narrowband chirp-shift-keying signal or narrowband multiple center-frequency-chirp signal generated by the receiver and outputting a sum of individual frequency components resulting from difference in distance of multiple paths for up-chirp signal portions and down-chirp signal portions of a chirp signal, respectively, the received composite signal being formed by superimposing and adding the narrowband chirp-shift-keying signal or the narrowband multiple center-frequency-chirp single chirp signals generated by the sender and received by the receiver via a multi-path channel;

a frequency compensation unit for multiplying outputs of the up-chirp signal portions and the down-chirp signal portions of the sum of individual frequency components outputted from the sampling unit to calculate a tolerance frequency output and compensating for a frequency tolerance of the sum of individual frequency components by using the tolerance frequency output to generate a frequency compensation output;

a discontinuity compensation unit for compensating for discontinuity of the narrowband chirp-shift-keying signals or the narrowband multiple center-frequency-chirp signals resulting from use of the narrowband chirp-shift-keying signals or the narrowband multiple center-frequency-chirp signals regarding the frequency compensation output generated by the frequency compensation unit and generating a discontinuity compensation output having no discontinuity;

a frequency analysis unit for decomposing the discontinuity compensation output generated by the discontinuity compensation unit into individual multi-path signals by using a frequency analysis method; and a channel estimation unit for extracting an attenuation component and a time delay component caused by the multi-path channel from the individual multi-path signals obtained by the frequency analysis unit by using a size of frequency components of each frequency.

13. An apparatus for performing channel estimation for electromagnetic wave multi-path characteristics between a sender and a receiver by using a wideband single chirp signal, the apparatus comprising:

a sampling unit for multiplying a received composite signal by a chirp signal generated by the receiver and outputting a sum of individual frequency components resulting from difference in distance of multiple paths, the received composite signal being formed by superimposing and adding wideband single chirp signals generated by the sender and received by the receiver via a multi-path channel;

a frequency analysis unit for decomposing the sum of individual frequency components outputted from the sampling unit into individual multi-path signal components by using a frequency analysis method; and a channel estimation unit for extracting an attenuation component and a time delay component caused by the multi-path channel from the individual multi-path signals obtained by the frequency analysis unit by using a size of frequency components of each frequency.

* * * * *